United States Patent [19]
Bruce

[11] Patent Number: 5,140,947
[45] Date of Patent: Aug. 25, 1992

[54] NEWBORN ANIMAL INCUBATOR

[76] Inventor: Robert C. Bruce, P.O. Box 94, Jordan Valley, Oreg. 97910

[21] Appl. No.: 758,300

[22] Filed: Aug. 28, 1992

Related U.S. Application Data

[63] Continuation of Ser. No. 562,231, Aug. 3, 1990, abandoned.

[51] Int. Cl.5 ............................................. A01K 29/00
[52] U.S. Cl. ..................................... 119/158; 119/102
[58] Field of Search ................. 119/158, 159, 102, 32

[56] References Cited

U.S. PATENT DOCUMENTS

| | | | |
|---|---|---|---|
| 1,577,387 | 3/1926 | Torova | 119/32 |
| 1,584,877 | 5/1926 | McCorkie | 119/32 |
| 1,879,915 | 9/1932 | Smoot | 119/102 |
| 2,718,214 | 9/1955 | Walker | 119/102 |
| 3,627,985 | 12/1971 | Hostetler | 119/32 |
| 3,765,610 | 10/1973 | Schell | 119/32 |
| 3,884,191 | 5/1975 | Stout | 119/158 |
| 4,020,796 | 5/1977 | Grifa | 119/158 |
| 4,056,078 | 11/1977 | Blafford et al. | 119/158 |
| 4,057,032 | 11/1977 | Dimitriadis | 119/158 |
| 4,382,424 | 5/1983 | Altissimo | 119/158 |
| 4,407,234 | 10/1983 | Kleman | 119/158 |
| 4,428,326 | 1/1984 | Dubovick et al. | 119/102 |
| 4,505,229 | 3/1985 | Altissimo | 119/158 |
| 4,550,686 | 11/1985 | Munks | 119/102 |
| 4,567,853 | 2/1986 | Hayden | 119/102 |
| 4,767,099 | 8/1988 | Munks | 119/102 |
| 4,796,565 | 1/1989 | Charbeneau | 119/102 |

Primary Examiner—Paul J. Hirsch
Attorney, Agent, or Firm—Frank J. Dykas; Craig M. Korfanta; Ken J. Pedersen

[57] ABSTRACT

Calf dryer 10 formed of end walls 13, side walls 12 and base 18, having transversed straps 20 and longitudinal straps 21 attached therein to form a webbed sling for holding newborn animal 11 in an upright position. Forced air heater 14 ducts forced air through heater ducts 15 in a plurality of heat vents 16 to warm the enclosure and dry the newborn animal's hair.

1 Claim, 3 Drawing Sheets

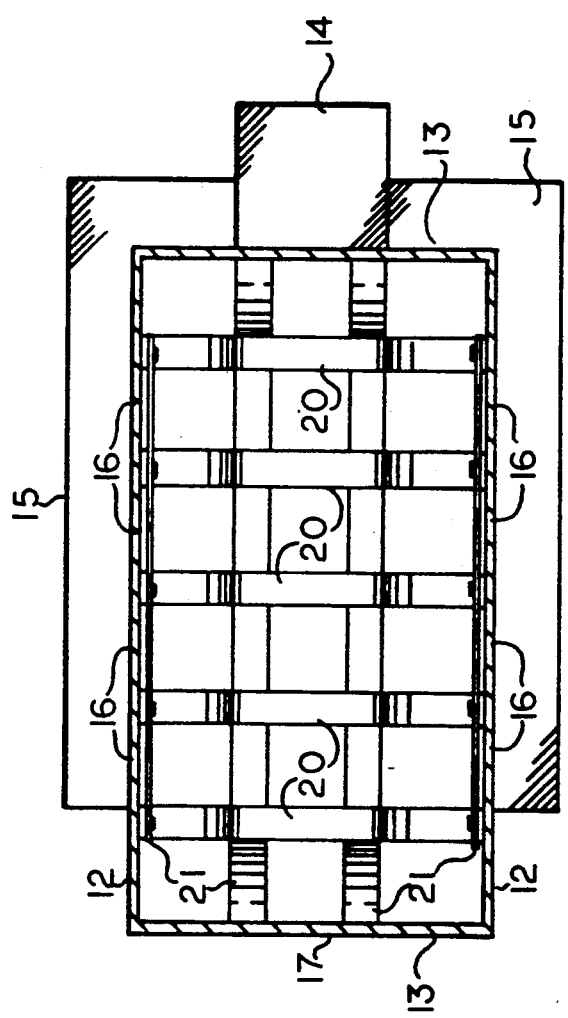

NEWBORN ANIMAL INCUBATOR

This application is a continuation of application Ser. No. 07/562,231 filed Aug. 3, 1990, now abandoned.

BACKGROUND OF THE INVENTION

1. Technical Field

This invention generally relates to an apparatus for drying newborn animals and more particularly to an apparatus for holding newborn animals such as calves in an upright position in a warm, forced air environment.

2. Background Art

There is a segment of the ranching industry which is generally known as the cow-calf operation. It is that portion of the ranching industry which deals with the birth of calves at the beginning of the beef production cycle. While it does vary somewhat with geographic location and climatic conditions, it generally revolves around the use of public range land as forage ground for breeding cows, commonly known as mother cows, and their young, which are for the most part destined for the feedlots.

The production cycle begins sometime in the winter or early spring with the calving of the mother cows to produce a new crop of young calves. The typical cow-calf operation usually requires between 100 and 400 mother cows. The cycle of breeding is timed so that the mother cows all calve within a month or so of each other, and at a time during the winter early enough to insure that the newborn calves have reached a body weight of between 200 to 300 pounds by the time the herd is let out onto the open range. If for example, the open range is available for forage from May until October, then the calving operation will be timed so that the calves are born in January and February.

Cow-calf operations require a home base pasture facility, usually located where the rancher lives, so that he can attend to the herd when it is not on the open range. Ideally, the home base operation is located in a sheltered valley.

In the general production cycle, calves are born in December, January or February, are kept with the mother cows in a pasture, and introduced, with the mother cows, to the open range in the spring, generally in May or June, at a body weight of between 200 and 300 pounds.

The mother cows will care for the calves, and the two will forage together over the summer months. As a general rule, mother cows will continue to nurse the calves during these summer months, thereby providing for optimal weight gain on the calves. While each mother cow is different, mother cows will not naturally wean a calf until it weighs approximately 600 pounds.

In the fall, usually in September or October, the cows and their calves are rounded up and herded into loading pens from where they are transported by truck back to the home base of operations. The roundup is still conducted by men and women on horseback in much the same way as it was when the western United States was first settled.

At the time the cows and calves are brought in from the range, the calves will generally weigh between 500 and 600 pounds and will either have been just weaned by the mother cow, or are ready for separation from her by the rancher. The calves are then either held over the winter at the home base, placed in a feedlot, or sold to other ranchers who will hold and feed them until they weigh between 700 and 1000 pounds when they are sold to a commercial feedlot for what is called finishing out, prior to slaughter.

Since many of the cow-calf rancher's costs are fixed or are dependant on the size of the breeding herd as opposed to being dependant on or directly related to the size of the calf crop, the loss of a calf represents a loss of income without a corresponding loss of expenses. This translates to a direct loss of profits. Loss of as little as 5% of the calf crop can result in a net financial loss to the rancher for the entire year.

The problem is that the most perilous time for the calf is the few hours immediately after birth. During the first hour or two after birth, the calf must do two things before the mother cow will accept it as her own and raise it. First it must get up off the ground, and the second, it must suckle the mother cow. If the calf does these two things, the mother cow will accept it and will take care of it.

The mother cow, immediately after calving, will instinctively get up, turn around, and start licking the wet calf, which is covered with afterbirth, in order to dry it. She will also nudge it and attempt to coax it onto its feet so that it will find the udder and start suckling. If the calf is dead, or otherwise cannot get up, she will instinctively clean what portions of the calve's fur coat are exposed and available to her and, after a few hours, start to wander away from the calf, eventually abandoning it. This sad process takes between one and three days, depending upon the breeding stock and the individual mother cow, with the mother cow returning to the exact site of calving periodically during this time period, to check to see if the calf is present, alive and able to suckle. She will return to the exact calving site periodically even if the calf's body has been removed.

Unfortunately, because of the time constraints, the requirement that the calf be a certain minimum weight prior to its introduction to the range in the spring, the calving time or period occurs during the cold winter months when inclement weather is likely. Calving of the breeding stock occurs more or less continuously during both the night and the day and regardless of the weather. It is not unusual for mother cows to be calving and giving birth in a pasture in the middle of the night during a snow storm.

When calving occurs during this kind of inclement weather, it is not uncommon for the wet newborn calf to be too weak or fatigued, at the time of birth, to be able to immediately get up onto its feet. As previously stated, the mother cow will attempt to coax and encourage it to get up, but if it does not get up within the first few minutes, its wet hair, in contact with the ground will freeze, sometimes even freezing to the ground. This phenomenon is called, in the industry, freezing down.

If a calf freezes down, it chills, and weakens very quickly and will die and in hour or two of hypothermia. The mother cow will continue to clean and dry the fur exposed, but if the calf if frozen down, she cannot clean the underside next to the ground. If the calf if frozen to the ground it is, of course, impossible for the calf to get up and as long as the condition continues, death is inevitable within a few hours.

The result to the rancher, if for example 10% of the breeding stock calves during a snowstorm, is a major financial loss. As a result, ranchers and their helpers will keep a vigil during the inclement weather to insure that the calves get up and are dried by the mother cows. If for some reason a calf does not get up, the rancher will usually pick it up and take it to shelter where it can be dried with a towel and kept warm until the weather moderates. It is not uncommon that this place of warm and dry shelter for baby calves is in a ranch house basement or the bathtub. Also, doing this is not a pleasant task for the ranchers since the baby calf will weigh between 70 pounds to 100 pounds and will be covered with a combination of melted and frozen afterbirth, which makes it very difficult and unpleasant to hand carry the calf.

As a result, development efforts have been made to provide animal carriers such as the calf sled disclosed in Hayden, U.S. Pat. No. 4,567,853.

Even if the calf is brought into a barn, or a basement, or even the rancher's bathtub, there is still a problem in that the calf is too weak to stand up. It will continue to lie down, usually upon its wet, frozen side. This prolongs the hypothermic condition, and in general, the calf will not recover as quickly as it would if it were standing and completely dried. Thus even if taken to shelter, a significant number of calves still die, primarily because of the delayed recovery from hypothermia.

Ideally, once the calf is inside a warm sheltered area, the rancher can get it standing on its feet and dry it off. And within a day or two, return it to the exact spot at which it was born, being relatively sure that the mother cow will be watching this spot, and will return to it to reclaim her calf, at least during the first one to three days. Once the mother cow and calf have been reunited, the rancher can assist the calf to start suckling the mother's teats, after which mother nature and instinct take over as the mother cow accepts the calf and begins to care for it.

What is needed is an apparatus which dries a newborn calf or other newborn animal and enables it stand on its feet. Accordingly, it is an object of this invention to provide an apparatus which holds a calf or newborn animal in an upright or on its feet position and provides a circulation of warm air to dry the animal. A second object is to provide an apparatus which provides a warm comfortable environment for a newborn calf of other animal in order to give the animal time to recover from hypothermia or exposure incurred in the moments after birth.

DISCLOSURE OF INVENTION

These objects are accomplished by use of an a single-wall enclosure sized to hold the whole newborn animal and a webbed harness which is attached to the interior surfaces to form a webbed sling for supporting the underside or belly of the animal with the four feet extending through the sling down to the base of the container such that the animal is supported in an upright position with both flanks, its back and the majority of its underside together with all of the leg surfaces exposed to the air. A forced air ventilation system is provided for supplying warm forced air from the bottom sidewalls up through the container in order to dry the animal's fur and warm it to proper body temperature.

BRIEF DESCRIPTION OF THE DRAWINGS

FIG. 3 is a top plan view of the animal dryer.

BEST MODE FOR CARRYING OUT INVENTION

Figure 1:
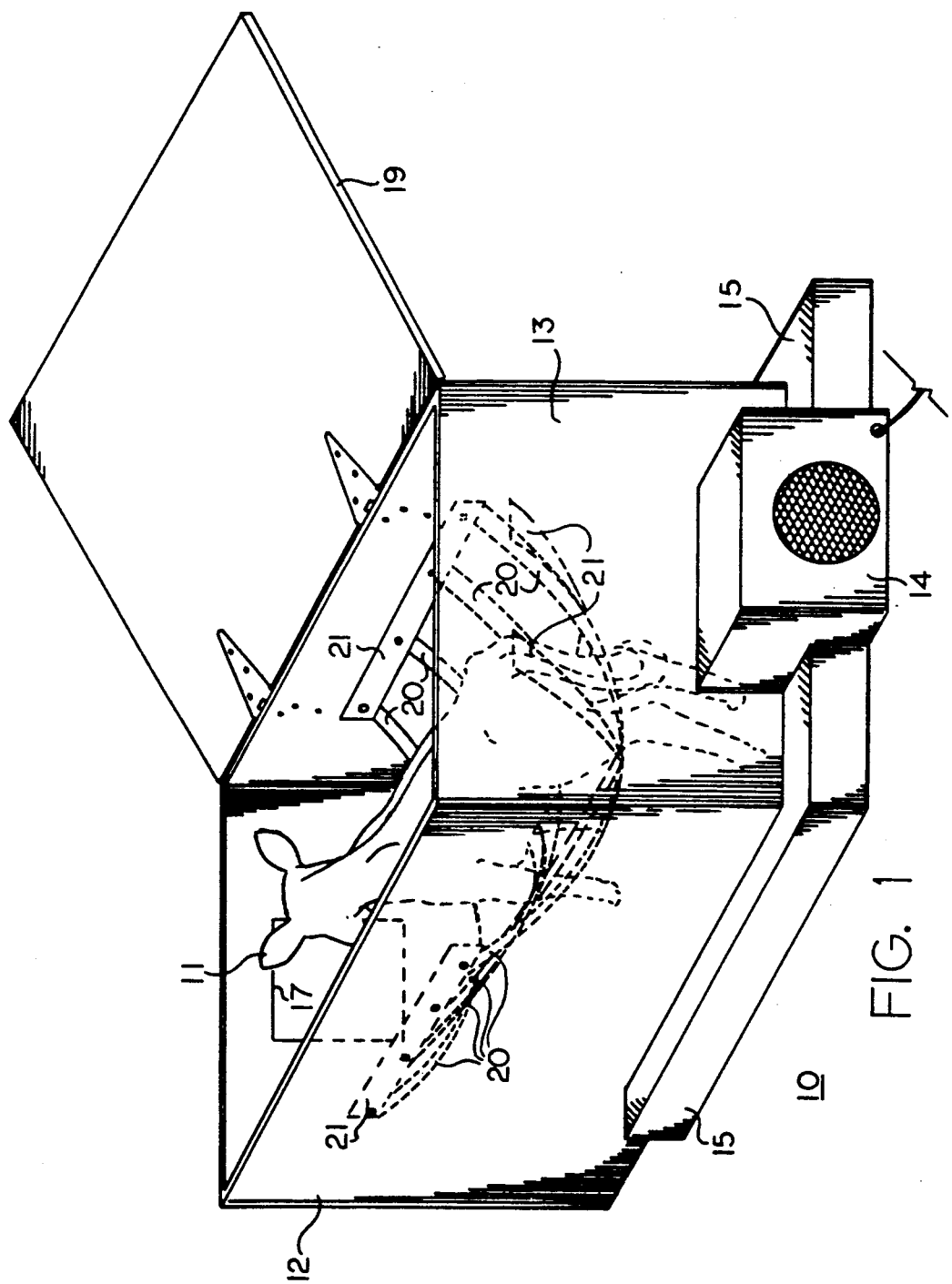
FIG. 1 is a perspective representational view of the animal dryer.
Figure 2:
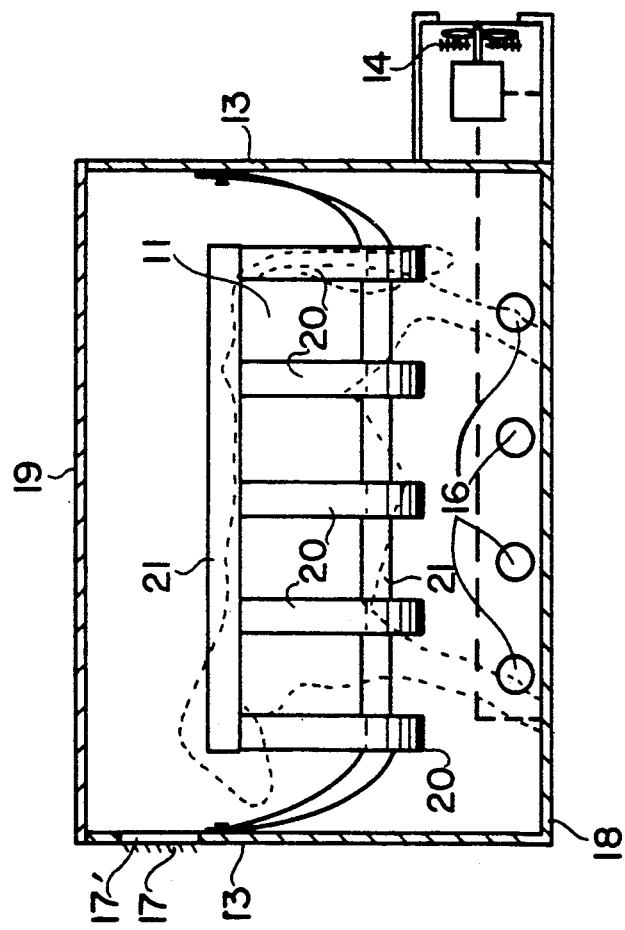
FIG. 2 is a sectional side view of the animal dryer.

As shown in FIGS. 1, 2 and 3, a calf dryer 10 is formed of a container having single-wall side walls 12 and base 18 to form a generally rectangular container. Attached to side walls 12 are a plurality of transverse straps 20, and attached to end walls 13 are longitudinal straps 21, which together interfit and are interconnected to form an animal sling at an intermediate height above base 18 such that it is suitable for holding calf 11 in a generally upright position with its feet resting upon base 18. Hinged lid 19 is also provided to close the top to form an completely enclosed environment for holding calf 11

Heating means 14, which in the preferred embodiment can be either a propane or electric forced air furnace, is provided together with heat ducts 15 to heat and push air through a plurality of heat vents 16 located in the base region of side walls 12. A thermostatic control, not shown but of well known conventional design, is also provided to insure that the air temperature inside the box is held at a safe level, which in the preferred embodiment, for use with baby calves is between 70° F. and 90° F. When lid 19 is closed, the baby calf is completely enclosed air from the container exhausts through exhaust grating 17' in exhaust vent 17 thus the baby calf is assured a continuous supply of warm, dry fresh air.

In use, if a weak, newborn calf is frozen down after birthing, all the rancher needs to do is to retrieve the calf from the birthing area and deposit it onto the strap assembly formed of transverse and longitudinal straps 20 and 21, insuring that the calve's hooves are not caught on strapping, but rather are inserted through the strapping towards the floor. If the calf is too weak to stand on its own, its body still remains in an upright position resting upon the straps. Eventually, as the calf is dried and warmed, it regains strength, and will stand in an upright position.

Upon positioning the calf into the webbing, the rancher then closes hinged lid 19 and activates the forced air heater in order to continuously supply warm forced air into calf dryer 10. The warm forced air circulates around the calf's body, drying its entire body, including the frozen down side, which developed when the calf was frozen down and exhausts through exhaust grating 17' in exhaust vent 17.

In practice it has been found that placing a newborn calf, which has been frozen down, and is suffering from hypothermia in calf dryer 10 for two to four hours, is sufficient to dry and warm the calf to a point where the calf is able to stand on its own.

Once the calf is warm and dry, it is removed from calf dryer 10 and returned to the location where it was born. In the meantime, the mother cow will have instinctively remained in the vicinity, and upon seeing the calf at the location where it was born, she will return to it and attempt to allow it to suckle. In most cases the initiation of suckling requires the assistance of the rancher to position the calf at the udder and insert into the calve's mouth one teat. Once the calf begins suckling, the mother cow will accept the calf as her own, and care for it from then on.

While there is shown and described the present preferred embodiment of the invention, it is to be distinctly understood that this invention is not limited thereto but may be variously embodied to practice within the scope of the following claims.

Accordingly, what I claim is:

1. An apparatus for warming and drying a newborn animal which comprises:
    a. A generally rectangular container comprising:
        two (2) planar side walls and two (2) planar end walls, said side and end walls being without any aperture which permits the head of the animal to protrude from the container,
        a base, and
        a hinged lid connected to the top end of one of the side or end walls, said lid being the only means for ingress and egress of the animal to and from the container;
    b. A webbed sling with transverse straps attached to said side walls and with longitudinal straps attached to said end walls, said webbed sling spanning the interior of the container,
        said sling supporting the underside of the animal, but allowing both the animal's flanks, it s back and the majority of its underside, together with all of it's leg surfaces, to be exposed, and
        said sling being positioned at an intermediate height above said base so that the animal is supported in an upright position, but with its feel resting upon said base; and
    c. A heating and ventilation system comprising:
        a forced air furnace,
        a heat duct,
        a plurality of heat vents located in the base region of the side walls, and
        an exhaust vent located in the lid region of an end wall,
        said heating and ventilation system supplying warm, fresh air up through the container from the base region to the lid region and around the animal's entire body.

* * * * *